(12) United States Patent
Stoila et al.

(10) Patent No.: US 10,821,688 B2
(45) Date of Patent: Nov. 3, 2020

(54) TIRE CLAMPING DEVICE

(71) Applicant: The Goodyear Tire & Rubber Company, Akron, OH (US)

(72) Inventors: George Michael Stoila, Tallmadge, OH (US); John Edward Anderson, Atwater, OH (US); Michael James Hogan, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/430,794

(22) Filed: Jun. 4, 2019

(65) Prior Publication Data

US 2020/0198269 A1 Jun. 25, 2020

Related U.S. Application Data

(60) Provisional application No. 62/782,474, filed on Dec. 20, 2018.

(51) Int. Cl.
*B29D 30/06* (2006.01)
*B29C 33/20* (2006.01)
(Continued)

(52) U.S. Cl.
CPC ........ *B29D 30/0605* (2013.01); *B29C 33/202* (2013.01); *B29C 33/22* (2013.01);
(Continued)

(58) Field of Classification Search
CPC ............ B29D 30/0603; B29D 30/0606; B29D 2030/0622; B29D 2030/0627
See application file for complete search history.

(56) References Cited

U.S. PATENT DOCUMENTS

| 2,834,049 | A | | 5/1958 | White |
| 2,904,832 | A | * | 9/1959 | Frohlich et al. ... B29D 30/0602 425/32 |

(Continued)

FOREIGN PATENT DOCUMENTS

| EP | 61850 | * 10/1982 |
| FR | 1151511 | * 6/1955 |

(Continued)

OTHER PUBLICATIONS

European Search Report for Serial No. EP19218342 dated May 7, 2020.

*Primary Examiner* — James P Mackey
(74) *Attorney, Agent, or Firm* — June E. Rickey

(57) ABSTRACT

A method of molding a green tire having a first and second bead area is described herein, wherein the method includes the steps of: inserting a tire clamping device inside a tire bladder and then inserting the tire clamping device and the bladder into the green tire, aligning the outer surfaces of the tire clamping device into engagement with a respective bead area of the tire so that each tire bead area is clamped between a respective upper and a lower mold ring and the tire clamping device during cure. A tire clamping device includes an inner portion, and a plurality of segments connected to the inner portion, wherein the tire clamping device has a closed position wherein the plurality of segments together forms a first and second ring for engagement with the bead areas of the tire so clamp the bead areas between the clamping device and the mold rings during cure.

6 Claims, 8 Drawing Sheets

(51) Int. Cl.
*B29C 33/22* (2006.01)
*B29L 30/00* (2006.01)

(52) U.S. Cl.
CPC ...... *B29D 30/0603* (2013.01); *B29D 30/0606* (2013.01); *B29D 2030/0622* (2013.01); *B29L 2030/001* (2013.01)

(56) References Cited

U.S. PATENT DOCUMENTS

| | | | |
|---|---|---|---|
| 2,939,175 A * | 6/1960 | Frohlich et al. ... | B29D 30/0602 |
| | | | 425/32 |
| 3,260,782 A | 7/1966 | Soderquist | |
| 3,868,203 A | 2/1975 | Turk | |
| 3,910,735 A | 10/1975 | Caretta | |
| 4,582,470 A * | 4/1986 | Sarumaru .......... | B29D 30/0602 |
| | | | 264/501 |
| 4,976,804 A * | 12/1990 | Kneip ................ | B29D 30/247 |
| | | | 156/401 |
| 5,597,429 A * | 1/1997 | Irie .................... | B29D 30/0602 |
| | | | 156/111 |
| 7,459,117 B2 | 12/2008 | Girard et al. | |
| 7,540,730 B1 | 6/2009 | Ouvahia et al. | |
| 8,127,434 B2 | 3/2012 | Currie et al. | |
| 8,955,571 B2 | 2/2015 | Kohnen et al. | |
| 2004/0011450 A1 | 1/2004 | Hanada | |
| 2017/0348932 A1 | 12/2017 | Pialot et al. | |

FOREIGN PATENT DOCUMENTS

| | | | |
|---|---|---|---|
| FR | 1236516 | * | 6/1960 |
| FR | 1381900 A | | 12/1964 |
| GB | 904595 | * | 8/1962 |
| WO | WO 2017/198739 | * | 11/2017 |

* cited by examiner

TIRE CLAMPING DEVICE

FIELD OF THE INVENTION

The invention relates generally to tires and more particularly to a pneumatic tire.

BACKGROUND OF THE INVENTION

For high performance and ultrahigh performance tires, it is often desired to eliminate the ply turnup around the bead. Eliminating the ply turnup removes the stress concentration especially when the tire construction is embodied with larger diameter fabric cords. However, it is difficult to build the tire without building the tire on a solid core. The solid core eliminates the movement of the carcass and builds a green tire with much less transformation in shape from the uncured to the cured tire. However, building a tire on a solid core requires special equipment and often is a much slower tire building process. Thus, it is desired to provide an apparatus that facilitates the building of a tire that has no ply turnup, and also facilitates use of heavy cord for the ply and does not require a solid core.

SUMMARY OF THE INVENTION

The invention provides in a first aspect of the invention a tire clamping device comprising an inner portion, and a plurality of segments connected to the inner portion, wherein the tire clamping device has a closed position wherein the plurality of segments has a first and second outer surface forming a ring when in the closed position.

The invention provides in a second aspect of the invention a method of molding a green tire having a first and second bead area, the method comprising the steps of: inserting a tire clamping device inside a tire bladder and then inserting the tire clamping device and the bladder into the green tire, aligning the outer surfaces of the tire clamping device into engagement with a respective bead area of the tire and a respective upper and lower mold ring so that each bead area is clamped between the respective mold ring and the tire clamping device during cure.

Definitions

"Aspect ratio" of the tire means the ratio of its section height (SH) to its segment width (SW) multiplied by 100 percent for expression as a percentage.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire dimensioned and configured in segment for receipt of an air tube therein.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by a shape with adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE PRESENT INVENTION

Figure 1:
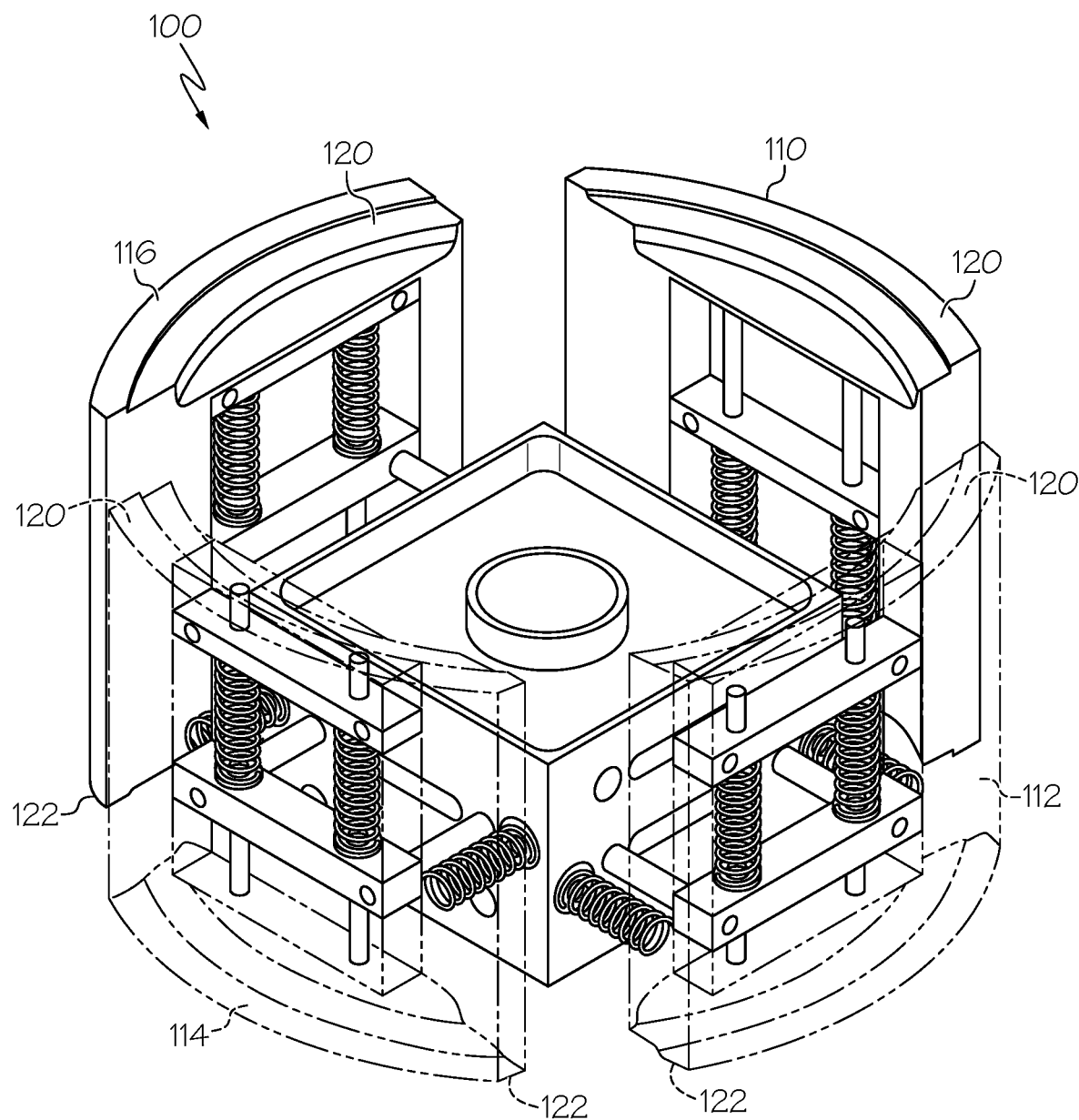
FIG. 1 illustrates a perspective view of a tire clamping device in the expanded position of the present invention.

FIG. 1 illustrates a perspective view of a tire clamping device 100 of the present invention, shown in the radially expanded position. The tire clamping device 100 is used to clamp the bead area of the tire in the mold to ensure the ply of the green carcass is clamped between the tire clamping device 100 and the tire mold. This allows a tire to be cured that does not have a ply turnup, and solves the problem of ply pullout during the cure when the tire is cured without a core.

The tire clamping device 100 includes a plurality of segments 110,112,114 and 116. As shown in FIG. 3, when the segments are in the fully closed position, the tire clamping device has a round shape. The plurality of segments when released together from the closed position, form outer portions 120,122 that engages the tire bead and the lower radial portion of the curing bladder 130 and hold the ply in place during cure. The outer portions 120,122 form a ring when the tire clamping device is in the closed position as shown in FIG. 2.

Figure 5:
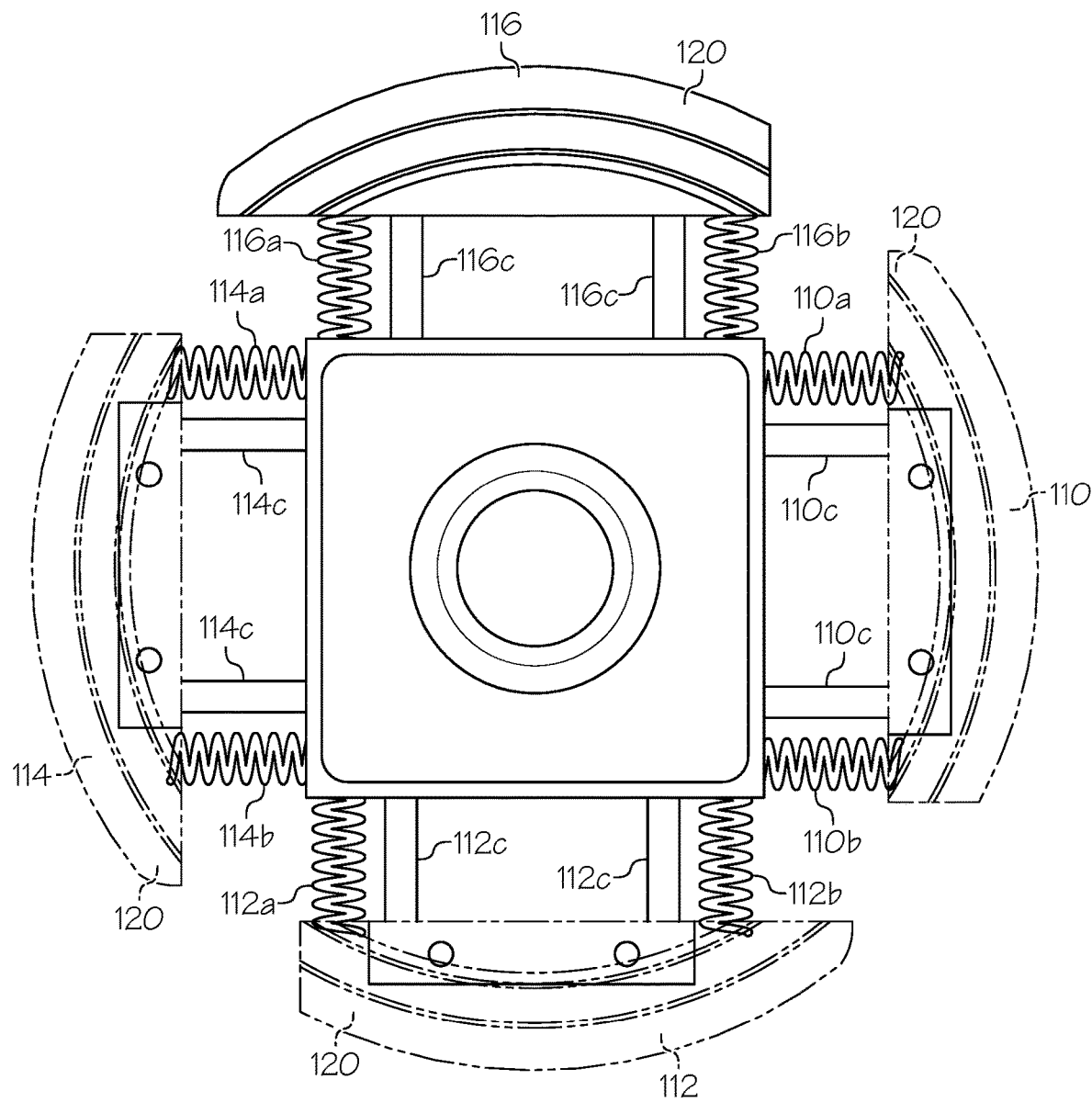
FIG. 5 illustrates a top view of the tire clamping device of FIG. 1.

FIG. 5 illustrates that the segments 110,112,114, and 116 each have respective radially oriented springs 116a,b, 110a,b, 112a,b and 114a,b. The radially oriented springs bias the segments 110,112,114,116 in the radially expanded position. Each segment also has guide rails 110c,112c,114c,116c. The radially oriented springs and the guide rails are located between the respective segments and an inner portion 130, in the example shown as a center square block 130 (although not limited to the square configuration).

Figure 2:
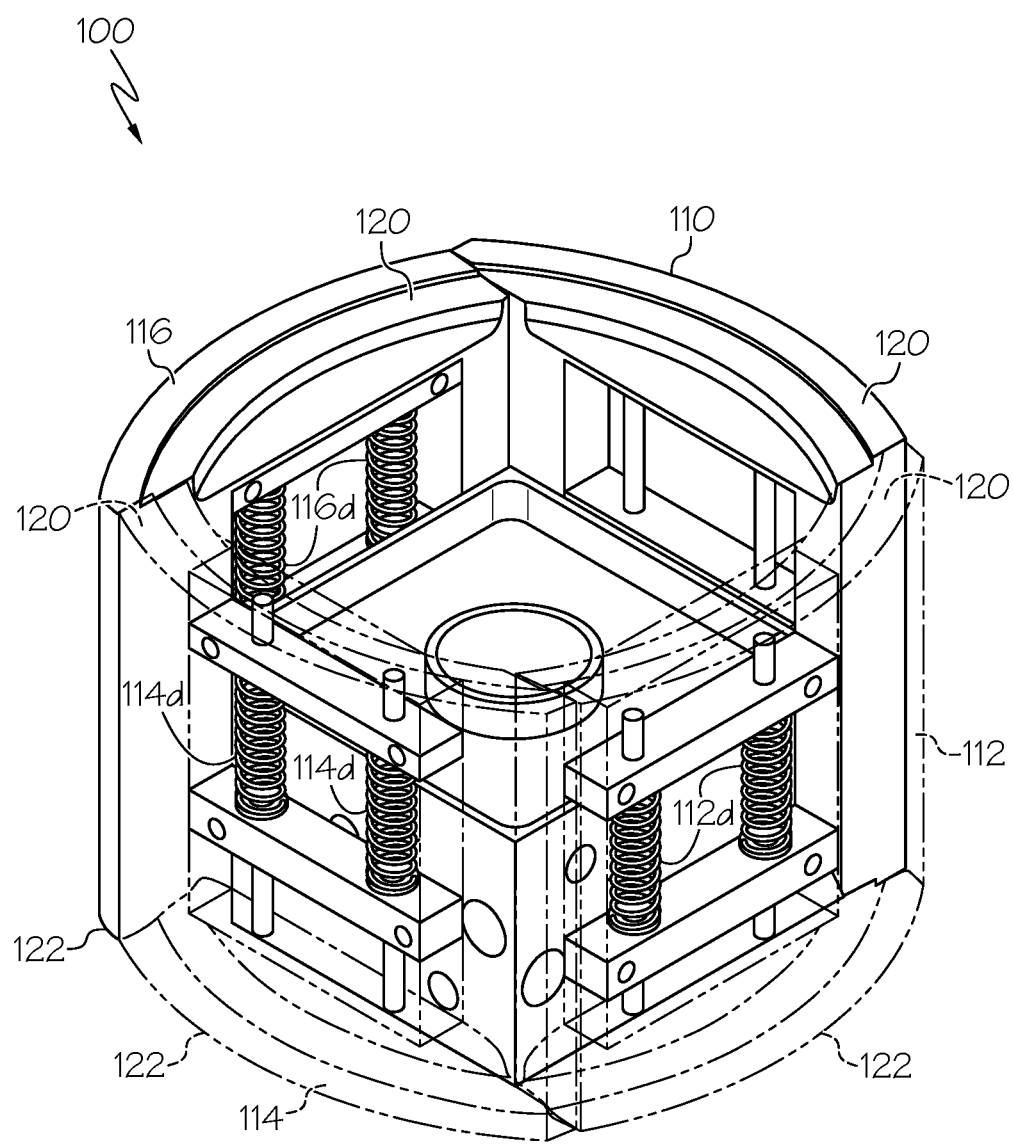
FIG. 2 illustrates a perspective view of the tire clamping device of FIG. 1 in the closed position.
Figure 3:
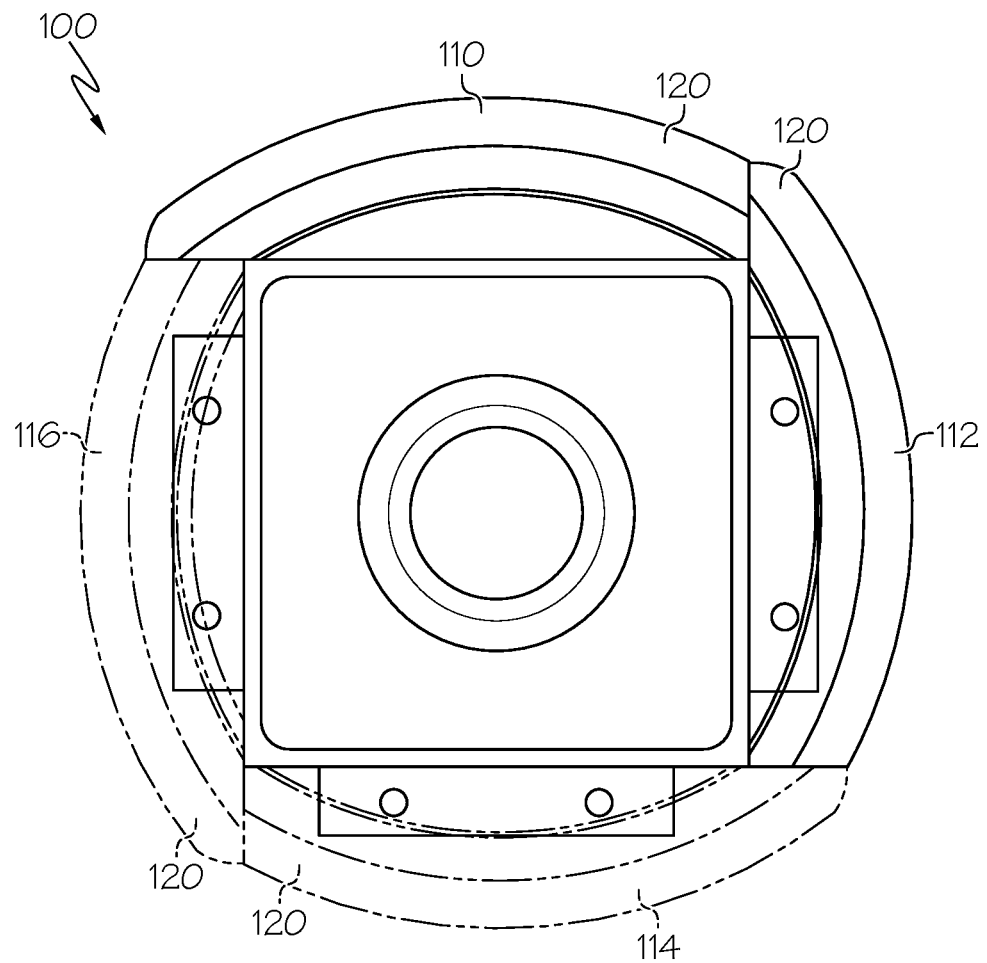
FIG. 3 is a top view of FIG. 2.
Figure 4:
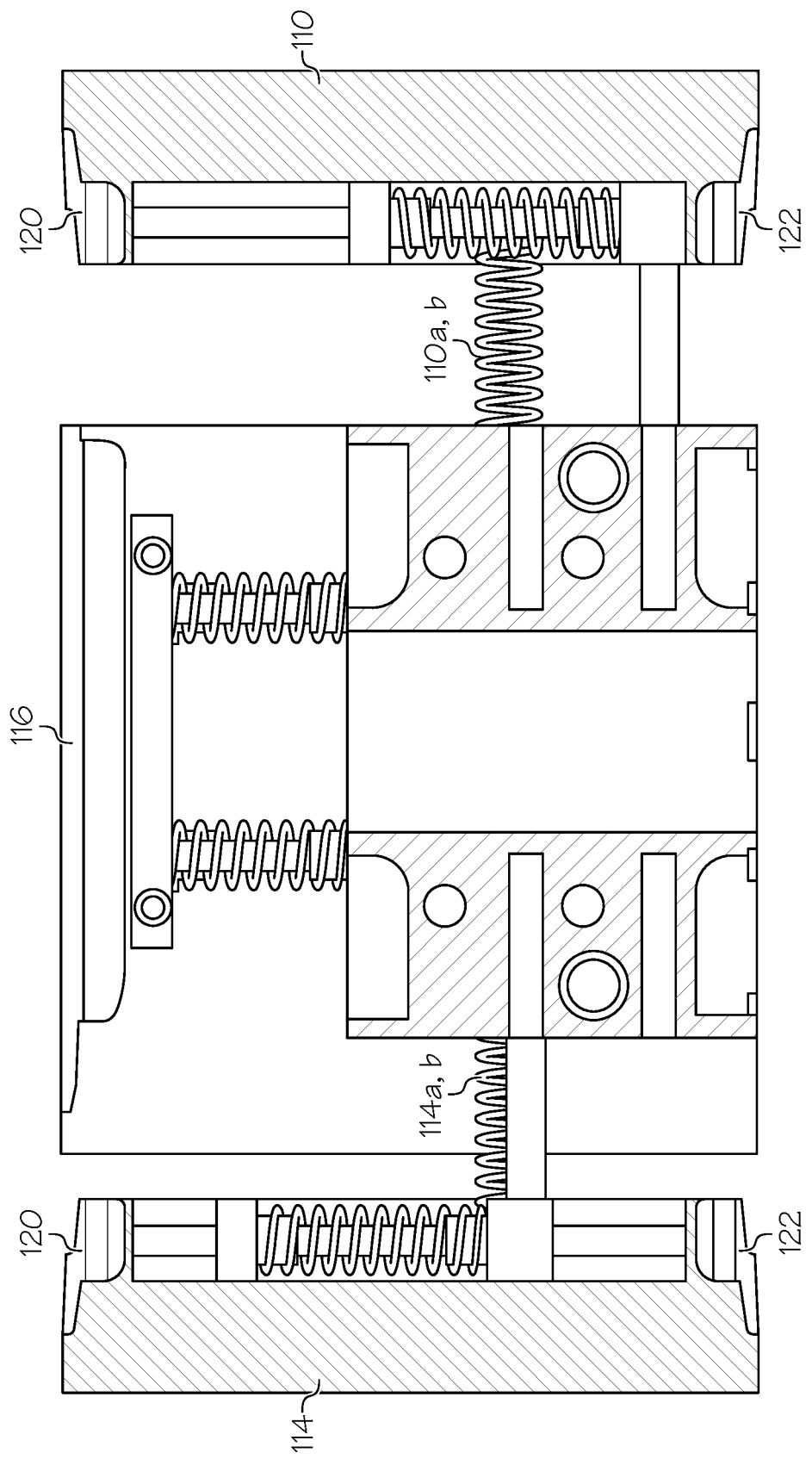
FIG. 4 illustrates a side view of the tire clamping device of FIG. 1.

FIG. 2 illustrates that the segments 110,112,114, and 116 each have transverse or axially oriented (with respect to the tire) springs 110d,112d,114d, and 116d that are perpendicular to the radially oriented springs. The springs may be replaced with other mechanical mechanisms known to those skilled in the art, to facilitate opening and closing the tire clamping device.

Figure 6:
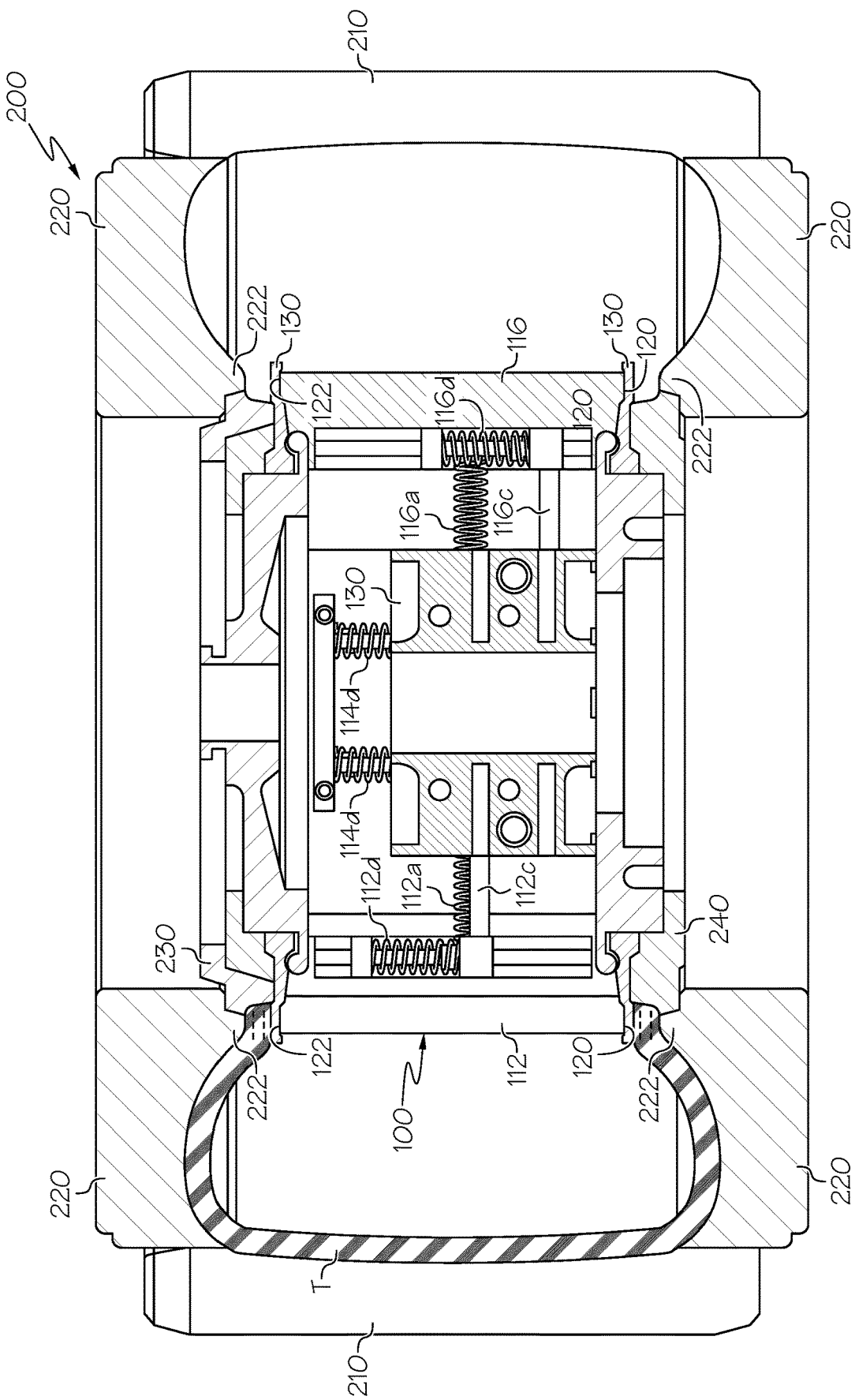
FIG. 6 illustrates a cross-segmental view of the tire clamping device installed in a tire mold (shown without a tire and only the bead ends of a bladder).

FIG. 6 illustrates a typical mold 200 used for curing passenger tires. The mold 200 has tread plates 210 for molding the tread of a tire, and sidewall plates 220 for forming the sidewalls of the tire. Each sidewall plates have a lower portion 222 located in the bead area of the tire. The mold further includes upper and lower mold rings 230,240 that are located adjacent the lower portion 222 of the sidewall plates. The mold rings and lower portions 222 of the sidewall plates work together with the tire clamping device to clamp the ply and bead area of the green tire during the cure.

Figure 7:
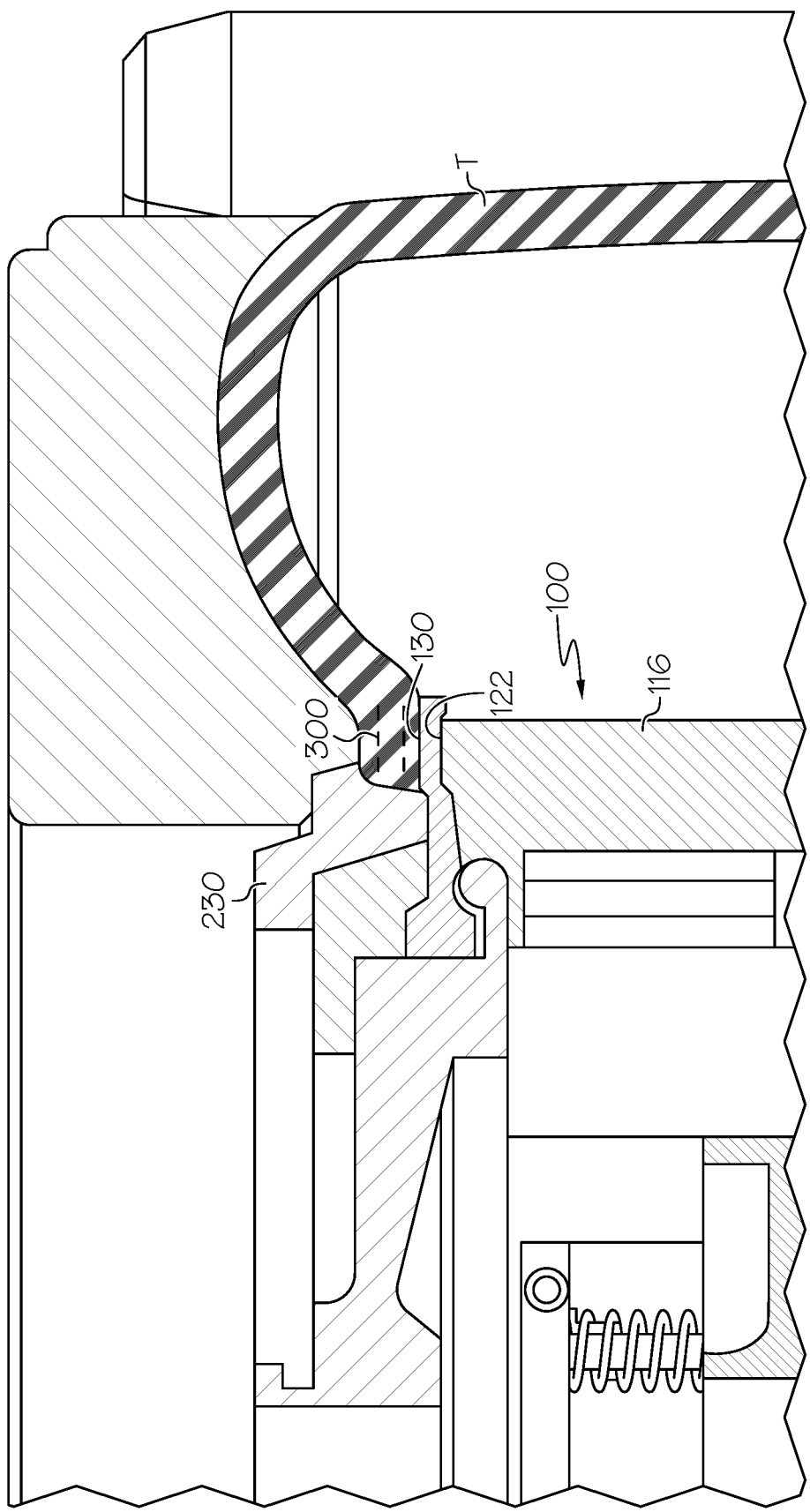
FIG. 7 illustrates a closeup cross-segmental view of the bead area in the tire mold.
Figure 8:
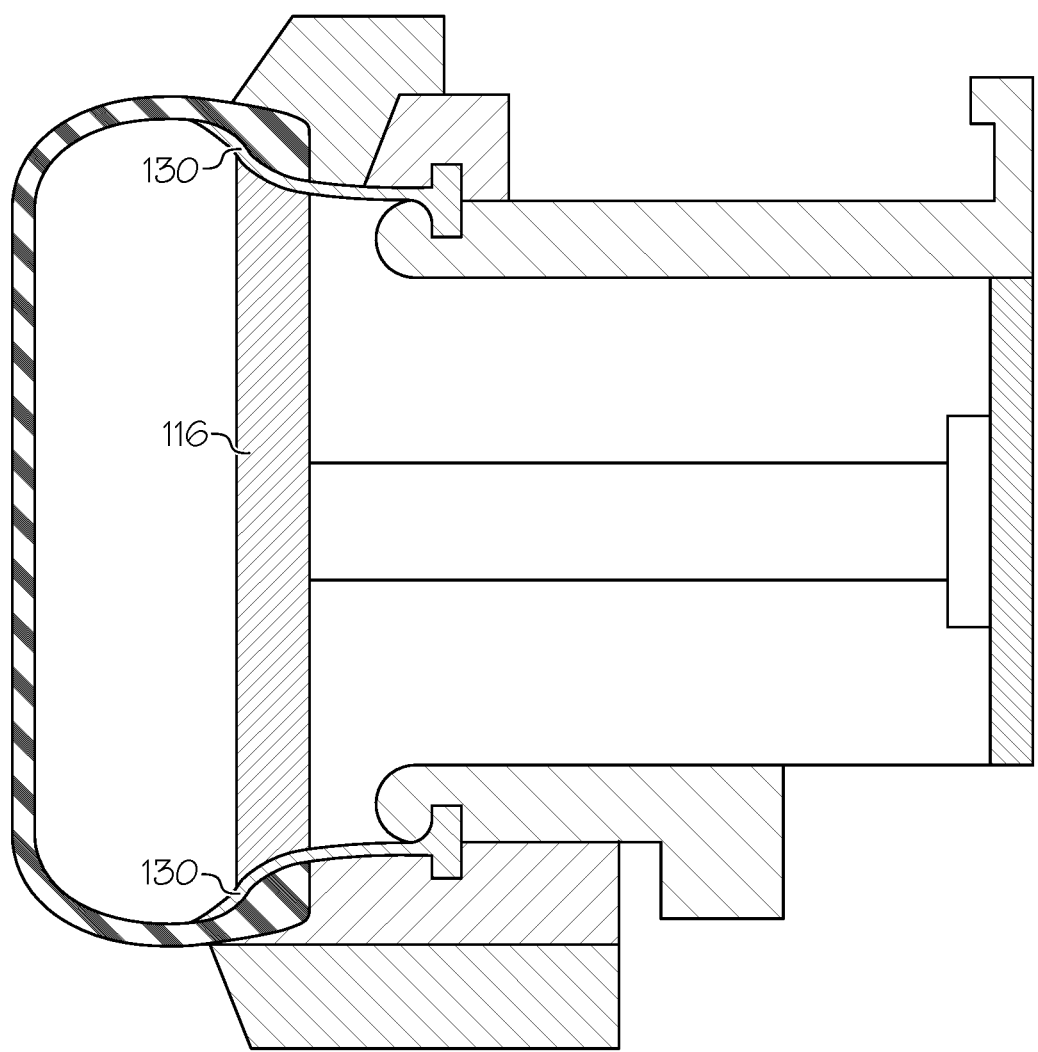
FIG. 8 illustrates a cross-segmental schematic of a tire in the tire mold with the ply clamping device and bladder installed.

In order to cure the tire, the tire clamping device is inserted inside a curing bladder (See FIG. 8). Next, the tire curing bladder with the tire clamping device inside is positioned in the mold. The bladder is stretched and then a vacuum is drawn on the tire bladder which results in the tire clamping device being collapsed into the closed position. Next, the green carcass is slipped over the closed tire clamping device and bladder. Next, the bladder is inflated and the bladder upper portions are lowered into the cavity of the green tire and the springs of the tire clamping device are released, so that the segments are biased in a radially outward direction. The bead area 300 (see FIG. 7) of the green carcass and bladder is clamped between the outer portions 122,120 of the tire clamping device and the respective upper and lower mold rings 230,240 and sidewall plate portions 222. Next, the tire is cured when the tire clamping device is in place to ensure that the ply remains positioned between the beads during cure and not pulled out of place due to the tire shaping pressure. Thus, the tire clamping device is sized so that when in the collapsed position, its outer diameter is less than the bead diameter, and capable of resiliently expanding so that its outer diameter in the expanded position is greater than the bead diameter of the green carcass to be cured. The vertical springs 112d to 116d allow the clamping blocks to levitate spatially and find centers between upper and lower mold ring parts and go to final position when the mold is fully closed and clamped.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:

1. A tire clamping device comprising an inner portion, and a plurality of segments connected to the inner portion, wherein the plurality of segments each have a first and second outer surface, wherein the first outer surfaces join together and form a first ring, and the second outer surfaces join together forming a second ring when the tire clamping device is in a closed position, and wherein there are a plurality of radially oriented springs for biasing each of the plurality of segments in a radially outward position, and wherein each radially oriented spring is connected to an axially oriented spring.

2. The tire clamping device of claim 1 having an open position wherein the segments are biased radially outward of the inner portion.

3. The tire clamping device of claim 1 having an open position wherein the segments are resiliently biased radially outward of the inner portion.

4. The tire clamping device of claim 1 wherein each segment has a radially oriented spring.

5. The tire clamping device of claim 1 wherein the inner portion is resiliently expandable in the axial direction.

6. The tire clamping device of claim 1 wherein the outer diameter of the tire clamping device in the closed position is less than a bead diameter of a tire to be cured.

* * * * *